(12) United States Patent
Fuhrer (10) Patent No.: US 6,395,969 B1
(45) Date of Patent: May 28, 2002

(54) SYSTEM AND METHOD FOR ARTISTICALLY INTEGRATING MUSIC AND VISUAL EFFECTS

(75) Inventor: John Valentin Fuhrer, Tarrytown, NY (US)

(73) Assignee: MXWorks, Inc., New York, NY (US)

( * ) Notice: Subject to any disclaimer, the term of this patent is extended or adjusted under 35 U.S.C. 154(b) by 0 days.

(21) Appl. No.: 09/628,507

(22) Filed: Jul. 28, 2000

(51) Int. Cl.$^7$ ............................................. G09B 15/02
(52) U.S. Cl. ................................................ 84/477 R
(58) Field of Search .......................... 84/477 R, 478; 434/307 A (56) References Cited

U.S. PATENT DOCUMENTS

| | | |
|---|---|---|
| 3,580,126 A | 5/1971 | Forkner |
| 3,801,186 A | 4/1974 | Dian |
| 3,892,478 A | 7/1975 | Lampkin |
| 4,056,805 A | 11/1977 | Brady |
| 4,262,338 A | 4/1981 | Gaudio, Jr. |
| 4,265,159 A | 5/1981 | Liebman et al. |
| 4,378,466 A | 3/1983 | Esser |
| 4,753,148 A | 6/1988 | Johnson |
| 5,048,390 A | 9/1991 | Adachi et al. |
| 5,064,345 A | 11/1991 | Knowles et al. |
| 5,113,738 A | 5/1992 | Krucoff |
| 5,166,463 A | 11/1992 | Weber |
| 5,275,082 A | 1/1994 | Kestner-Clifton et al. |
| 5,286,908 A | 2/1994 | Jungleib |
| 5,300,727 A * | 4/1994 | Osuga et al. ............. 84/477 X |
| 5,339,741 A | 8/1994 | Craven et al. |
| 5,420,801 A | 5/1995 | Dockter et al. |
| 5,453,568 A | 9/1995 | Tajima et al. |
| 5,508,470 A | 4/1996 | Tajima et al. |
| 5,530,859 A | 6/1996 | Tobias, II et al. |
| 5,557,424 A | 9/1996 | Panizza |
| 5,684,259 A | 11/1997 | Horii |
| 5,689,078 A | 11/1997 | McClard |
| 5,732,267 A | 3/1998 | Smith |
| 5,781,186 A | 7/1998 | Jennings |
| 5,832,309 A | 11/1998 | Noe et al. |
| 5,877,445 A | 3/1999 | Hufford et al. |
| 5,952,597 A | 9/1999 | Weinstock et al. |
| 5,953,005 A | 9/1999 | Liu |
| 6,051,769 A * | 4/2000 | Brown, Jr. ................ 84/477 R |
| 6,062,868 A * | 5/2000 | Toriumi .................. 434/307 A |
| 6,074,215 A * | 6/2000 | Tsurumi ................. 434/307 A |
| 6,084,168 A * | 7/2000 | Sitrick ...................... 84/477 R |
| 6,084,169 A * | 7/2000 | Hasegawa et al. ........ 84/477 X |

OTHER PUBLICATIONS

Web pages retrieved from the Internet on Jan. 10, 2001at <URL:www.creativepro.com/story/news/6989.html>that describe Vidvox Prophet Quicktime Sampler software.
Web pages retrieved from the Internet on Jan. 22, 2001 at <URL:www.arkaos.net>that describe Visualizer software.
Web pages retrieved from the Internet on Jan. 10, 2001 at <URL:mediabuilder.com/9450.html>that describe Vjamm software.
Web pages retrieved from the Internet on Jan. 10, 2001 at <URL:www.ninjatune.net/vjamm/tecnical.html>that describe Vjamm software.
Web pages retrieved from the Internet on Oct. 30, 2000 at <URL: www.ibase492.eunet.be/products/expose/index.html>that describe Expose and Expose LT software.

* cited by examiner

Primary Examiner—Stanley J. Witkowski (57) ABSTRACT

A multi-media system, software and method for integrating music performance with visual effects. The method includes the step of storing a plurality of items each of which contains visual effect, allowing a first user to select at least one subset of the plurality of items and forming each of the at least one selected subset of the plurality of items into a file. The method also includes the steps of allowing a second user to select one of the files, allowing the second user to select one item in the selected file, and playing the selected item as the music performance is being played.

11 Claims, 5 Drawing Sheets

PALETTE DATA STRUCTURE

"PALETTES" ARE APPLE QUICK TIME™ VIDEO FILES CONTAINING VIDEO CLIPS OF THEMATICALLY RELATED SOURCE MATERIAL.

THE VIDEO MAY EXIST IN THE QT FILE AS EITHER A SINGLE CONTINUOUS VIDEO TRACK, OR EACH CLIP MAY OCCUPY A SEPARATE VIDEO TRACK, EACH WITH A START TIME OF 00:00:00.

QUICK TIME FILE
SINGLE TRACK

| CLIP 1 | CLIP 2 | CLIP 3 | CLIP 4 | • • • | CLIP N |

FIG.1A

QUICK TIME FILE
MULTIPLE TRACKS

| CLIP 1 |
| CLIP 2 |
| CLIP 3 |
| • • • |
| CLIP N |

SYSTEM AND METHOD FOR ARTISTICALLY INTEGRATING MUSIC AND VISUAL EFFECTS

FIELD OF THE INVENTION

The present invention relates to a multimedia system and software for creating, storing, organizing, integrating, and displaying recorded or live visual effects with recorded or live music performances.

BACKGROUND OF THE INVENTION

Attempts to enhance music performances, either live or recorded, by adding visual effects or visual interpretations of music have been made using a number of diferent methods and visual media. For example, elaborate lighting systems, manual or computer controlled, used to create moods and punctuate the rhythm and dynamics of live performances are known in the art. In another example, displaying still pictures or moving pictures on large screens as a backdrop to live performances is also known in the art. Furthermore, conventional multimedia systems that combine music with images, text, animation, video, and other similar effects have been used for recorded or live performances.

Recently, as a natural progression of the above examples, there has been interest in integrating computer generated graphics as visual interpretations of music. Computer generated graphics may include abstract, flowing graphic images created in realtime by software running on a computer, still photographs in digital format, three-dimensional computer graphical objects and/or moving-video. With respect to the moving-video visual interpretations, there have been attempts to allow for some level of rhythmic interpretation of the music by using switchers to "cut" in traditional editing style, e.g., inserting one non-synchronized video source to another. These methods, however, involve pre-established algorithms to integrate the video effect and music, and do not provide for "realtime" editing or integrating of the video effect to synchronize with the music.

The above described conventional systems, therefore, have not furnished a satisfactory solution to provide a visual performance artist (i.e., a person adding the visual interpretation to music performances) with tools necessary to allow substantially interactive and interpretive control over the visual media, while maintaining the ability to maintain synchronization of music. Most often, the visual interpretations are prerecorded and cannot be altered during recorded or live music performances.

The use of MIDI (Musical Instrument Digital Interface), a standard for controlling electronic musical instruments, has been a logical choice as a means to control the visual interpretations in the context of live performances. Although using MIDI addresses the means of interfacing the computers and performers involved, it does not solve technical problems of creating visual software that can respond quickly or "on-the-fly" /realtime to interpret the MIDI control commands that occur at a very rapid pace when rhythm-based music is interpreted by a visual performance artist.

This has been especially problematic when attempting to use digitized moving-video. Current tools are incapable of providing full screen video being triggered in realtime without a response latency which visual performers find unacceptable. In other words, a performer cannot, with the current tools, select and trigger a full-screen video clip, and have it appear immediately on the screen without latency. This makes it difficult, if not impossible, to "play" video clips interpretively, in synchronization or rhythm with the music. The result is a visual performance which seems "detached" from the music. This results in less opportunity to enhance and complement the musical performance. In fact, the visual elements may become distracting.

In the above-described conventional systems, the desired individual visual images are required to be loaded to Random Access Memory (RAM) in the computer, and therefore, the loading and unloading of individual images and the music results in an unacceptable latency or delay. Moreover, these systems are constrained in the amount of visual images that can be created, stored, accessed, and displayed.

SUMMARY OF THE INVENTION

The present invention provides a multimedia production and performance system or "software tool" comprising software that allows the performing visual artist to create a palette of one set or multiple sets of digitized visual images, select a visual image or images from a palette, and have those images displayed substantially instantaneously on the performance surface, such that the performer may "play" the visual images rhythmically and in synchronization with the music performance like an instrument.

The present invention also allows the visual artist to use either a standard computer keyboard or MIDI keyboard to interact with the software tool, such that striking the keys allows the artist to access and display a visual image by playing the keyboard like an instrument.

In addition, the present invention allows the visual artist to record his/her visual image performances into a standard MIDI sequencer such that the performances may be saved and recorded on CD-ROM or Digital Versatile Disc (DVD), and edited as part of the creative musical process, without the need for or knowledge of traditional digital video editing equipment and software. The performances can then be played back at a later time on a standard CD or DVD player, in synchronization with other pre-recorded musical or visual elements.

In a live concert or club environment, the system transforms the music performance into a multidimensional, multi-sensory experience, with surround audio and multiple surfaces of synchronized visuals enveloping the visitor. In the studio, the system functions to create "video re-mixes" for DVD, enhancing pre-existing audio and video with surround mixes and multiple, selectable synchronized visual tracks.

In particular, the present invention includes a method for integrating music performance with visual effects. The method includes the step of storing a plurality of items each of which contains a visual image, allowing a first user to select at least one subset of the plurality of items and forming each of the at least one selected subset of the plurality of items into a file. The method also includes the steps of allowing a second user to select one of the files, allowing the second user to select one item in the selected file, and displaying or "playing" the selected item as the music performance is being played.

BRIEF DESCRIPTION OF THE DRAWINGS

Preferred features of the present invention are disclosed in the accompanying drawings, wherein similar reference characters denote similar elements throughout the several views, and wherein.

DETAILED DESCRIPTION OF THE INVENTION

The Media Farm.

A "media farm," a storage device containing a number of palettes, is created as part of the present invention. A palette is a group of visual images or moving video clips that are related or organized in some way by a common thread or theme. For example, the common thread or theme may be a particular mood such as light and energetic, happy or sad; particular subject matter such as fashion, sports, political or social events, etc., or a artistic specific approach to creation, such as abstract, industrial, gothic, hip-hop, etc. A palette therefore can be a set of 50 or so video clips, all of which have people wearing hi-tech attire as their subject, or a set of 60 still images which are all 3D renderings of large industrial machines, or a set of video clips of explosions of different types. The specific theme or common thread of the visual images or video clips on the palette is not important. Additionally, the precise number of visual images or effects comprising a palette is not important. Instead, what is important is that the user community, the individuals who create the visual art and contribute to the content, decide what comprises a complete and cohesive, and professional-looking palette of digitized visual material.

Visual artists use a Web interface to interact with a database of visual effects and images contributed by themselves and other visual artists. The interface allows the artist to start a new theme or "palette", or upload files to submit their visual work as a candidate for inclusion in an existing palette. The database is preferably maintained by a server.

More specifically, a user community (i.e., a collection of visual performance artists) is allowed to decide what comprises an artistic and perhaps cohesive palette. In the first instance, a Web site containing a visual media database is created. The visual media database is preferably configured to store numerous visual images which may comprise computer generated graphics, video and film clips, live video camera input, photographic stills and original art, and high tech visual effects and transitions. The Web site is further configured to provide a graphical user interface that allows the visual performance artist(s) to select any of the stored visual images and upload them into one or more candidate palettes. The interface may also allow an artist(s) to start a new candidate palette. The stored still images or video clips in the database that can be uploaded into a candidate palette are referred as an "open pool". While the candidate palettes are being created, the artist community is also allowed to cast votes to determine which specific visual image becomes part of a palette(s). Those that receive adequate votes from the artist community become part of a final palette, while those that receive poor scores are returned to the open pool of work, and may be resubmitted by the original artist as a candidate for a different-themed palette, or suggested as a candidate for another palette by any artist in the community. The database is preferably a SQL server (e.g., Oracle, Sybase).

The contributing artists are then contacted and presented with appropriate license agreements for the use, reproduction, and display of the visual images. While the terms of the agreements may vary, preferably, a royalty rate is calculated based on the percentage of the total content in that palette which the subject artist has created. The contributing artists may be contacted automatically (e.g., via e-mail) by a server computer or through a computer network.

This method of creating a media farm of visual images not only provides a creative outlet for his/her visual image works, but it also creates and provides for an ongoing revenue-generating market. Moreover, the media farm creates an ever growing supply of visual image content that music and visual artists and performers, and other members of the music recording and entertainment industries can use with the multimedia production and performance system and software described herein.

Further, one of ordinary skill in the art will readily appreciate that the foregoing method of creating, organizing, and storing a palette of digitized visual images may be implemented over any computer network or Intranet.

Realtime Multimedia Production and Performance System

Figure 1A:
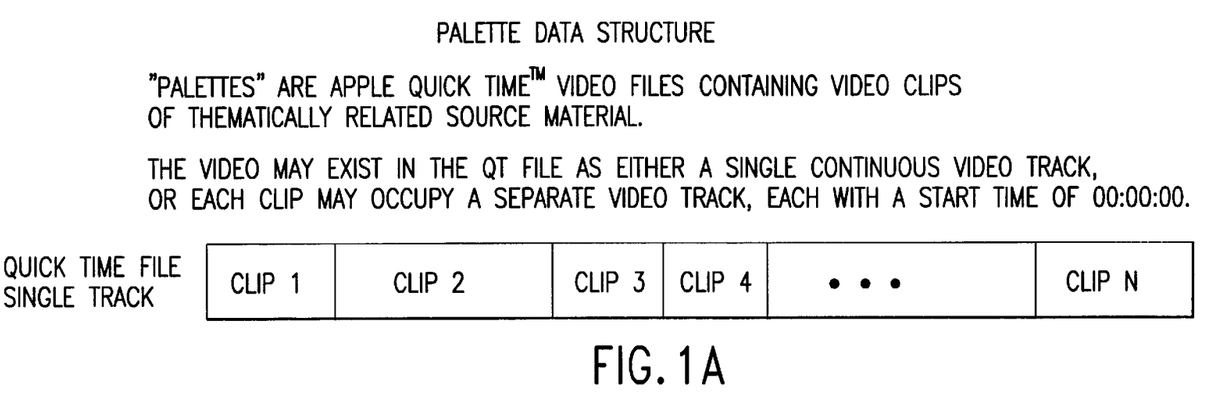
FIGS. 1A and 1B are schematic diagrams depicting file formats for storing a number of visual effects.
Figure 1B:
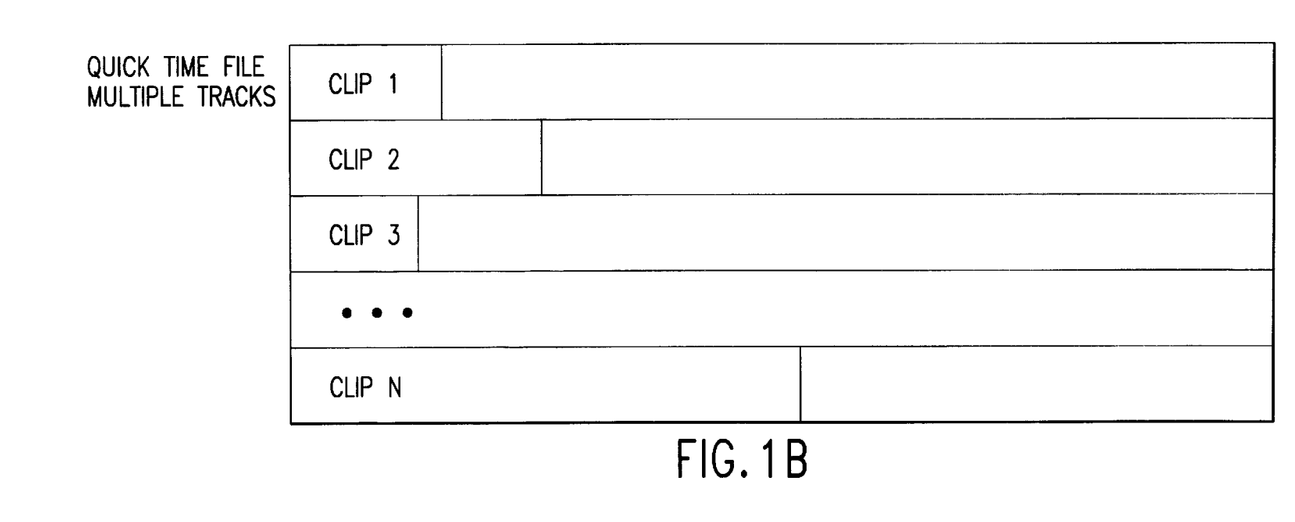

Once a final palette is completed, the individual visual images selected as parts thereof are automatically brought together or "rendered" into a single computer file, preferably an Apple QuickTime™ (preferably v.4 or later) file as shown in FIGS. 1A and 1B. For instance, a palette may contain a single continuous video track if QuickTime™ format files are used each with a corresponding start time as shown in FIG. 1A. In an alternative embodiment, each video clip may occupy a separate video track of the QuickTime™ format files, each with a start time of 00:00:00 as shown in FIG. 1B. Any combination of tracks as shown in FIG. 1A and FIG. 1B may also be used.

Figure 2:
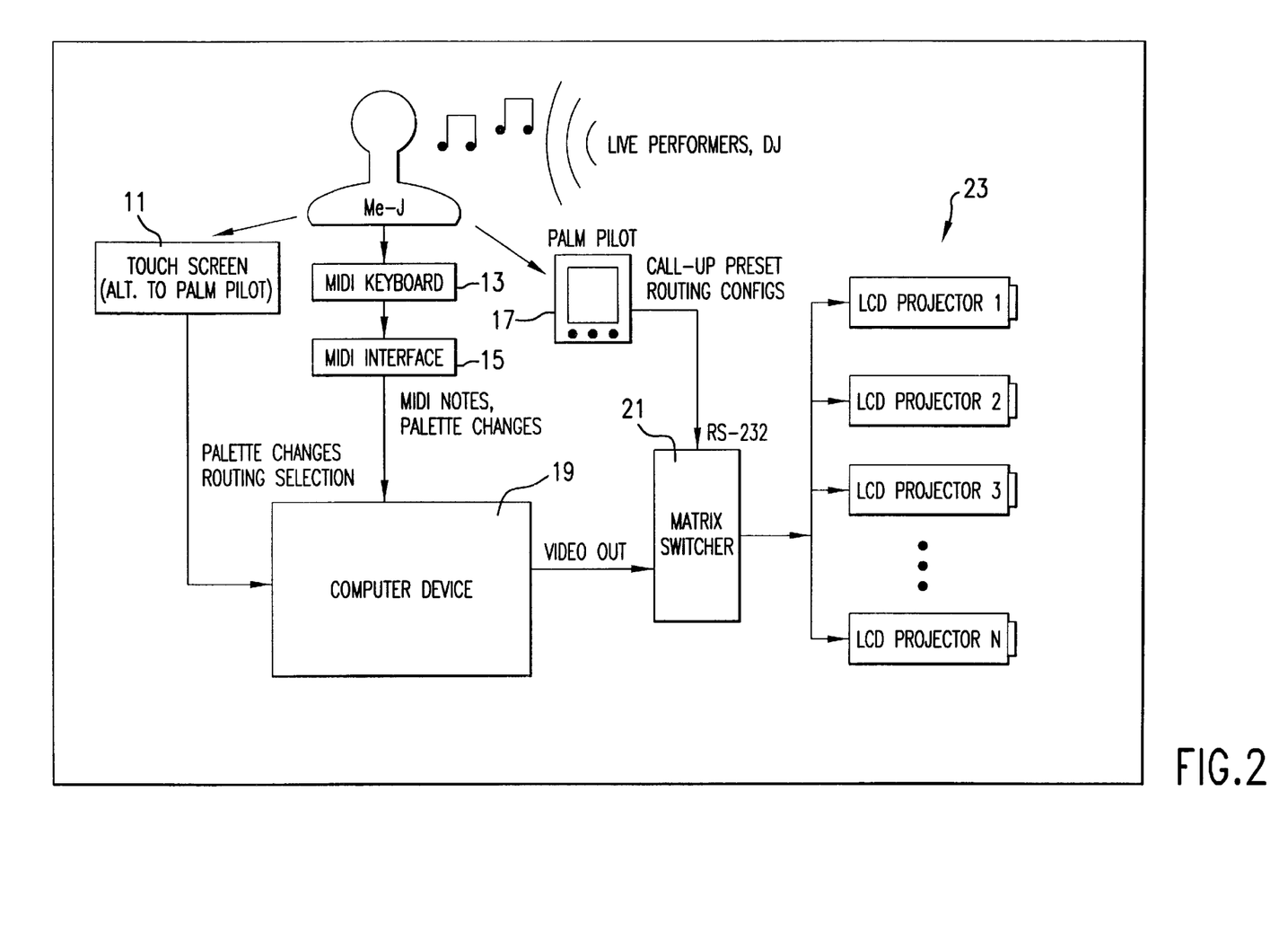
FIG. 2 is a block diagram of the present invention that integrates live music performance with visual effects.

Referring to FIG. 2, there is shown a preferred embodiment of the present invention configured to allow a visual performance artist to add visual interpretations to live musical performances using the palettes described above. The system includes a touch screen 11, a MIDI keyboard 13, a MIDI interface 15, a route changer 17, a computer device 19, a matrix switcher 21 and a number of projectors 13. MIDI keyboard 13 is preferably a velocity sensitive keyboard (e.g., D50 manufactured by Roland). MIDI interface 15 can be any MIDI interface such as MIDI Time Piece AV manufactured by Mark of the Unicorn. Examples of route changer 17 include RS 4×4 or RS 8×8 manufactured by Knox.

Touch screen 11 is configured to provide a variety of options to users of the system. For instance, touch screen 11 allows the users to enter commands to change one palette of video clips to another. Touch screen 11 is any touch sensitive liquid crystal display.

Computer device 19 is configured to store a number of palettes (i.e., the final palettes). As discussed above, each palette includes an indexed and thematically related video files. Computer device 19 includes a processor (e.g., a central processing unit) configured to execute software implementing the method of the present invention discussed below. Preferably, computer device is a Personal Computer or Unix Workstation.

Figure 3:
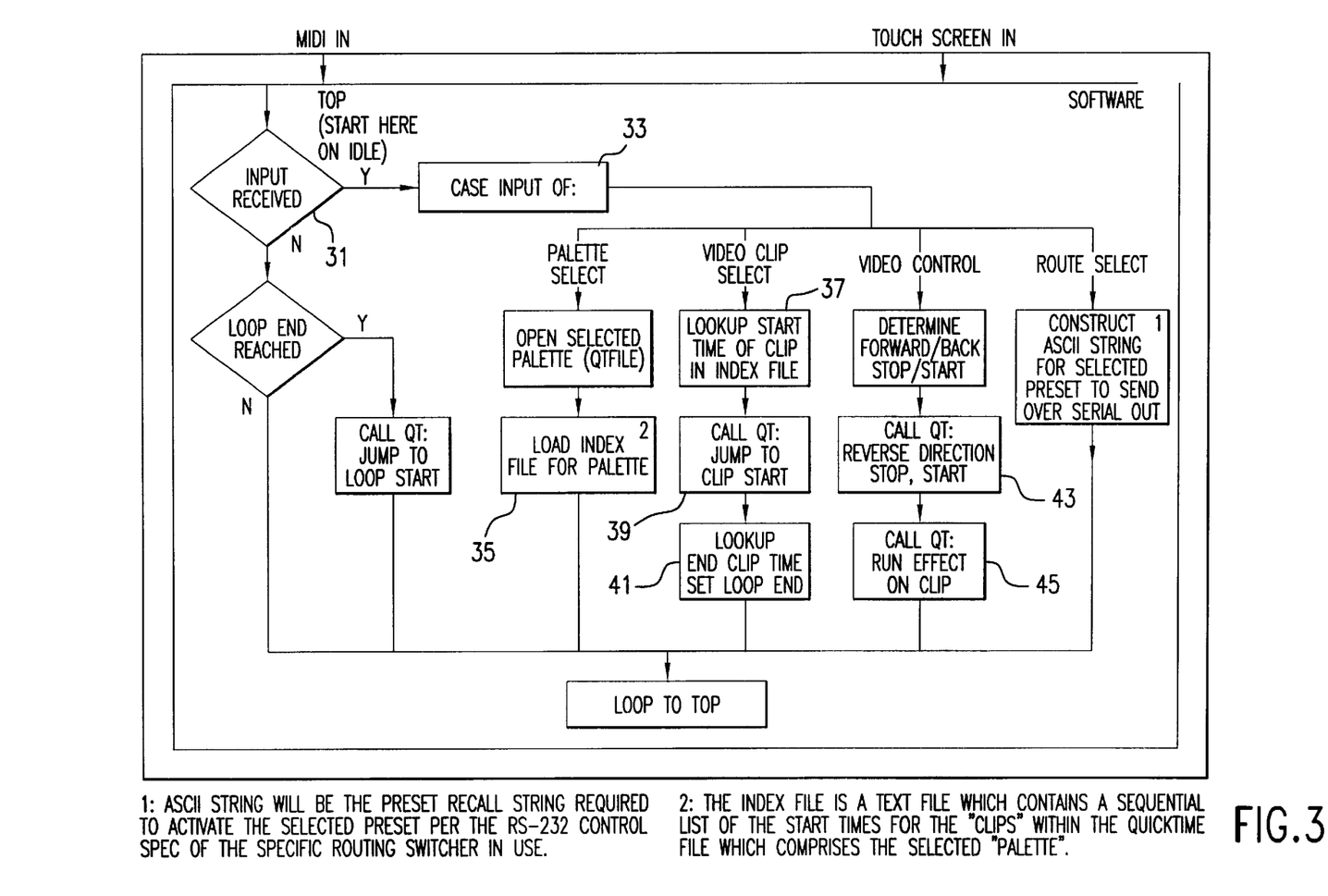
FIG. 3 is a flow chart of the present invention for integrating live music performance with visual effects.

Referring to FIG. 3, in a preferred embodiment of the invention, the processor is configured to receive input data from touch screen 11 and MIDI interface 15. The processor runs an infinite loop. As a first step of the loop, the program determines whether or not input data is received (step 31). If no input data is received, the loop repeats the step of determining whether or not any input data has been received.

When input data is received, the input data is analyzed (step 33) to determine which one of the following category the input data belongs: (a) palette select; (b) video clip select; (c) video control; and (d) route select. The palette select input data indicates which one of the stored palettes in computer device 19 is to be used. The video clip select data indicates which one of the clips among the clips stored within the selected palette is to be displayed. It should be noted that a video clip may include a segment of moving images or a still image(s) continually displayed for any given length of time. The video control signal handles how the selected video is to be controlled. Lastly, the route select controls which one or more of display monitors 23 are to display the selected video clip.

When the input data is information relating to which one of the palette is to be selected, the selected palette is loaded into the running QuickTime™ file. Because all of the clips of the current palette are stored in a running QuickTime™ file, the video clips stored within the QuickTime™ file can then be displayed in realtime without any perceivable latency. It should be noted that in other embodiments, instead of QuickTime™ files other streaming video software, as known in the art, may be used.

In step 35, an index of the selected palette is loaded to a local memory of the computer device. The index is a list of start and end times of the clips contained in the selected palette when the format of FIG. 1A is used.

When the input data is information relating to video clip select, the start time of the selected video clip is looked up in the index (step 37). A message is sent to the video stream player to start playing video clip that begins at the start time looked up in step 39. Furthermore, the end time of the selected video clip is also looked up in the index. The end time indicates when the program returns to the loop (step 41).

When the input data is information relating to the video control, the input data relates to the direction in which the selected video clip is to be played. For instance, the selected video clip may be stopped and started at any number of times at any arbitrary point within the start and end times looked up from the index. The selected video clip may even be played in reverse the direction (step 43). In step 45, a filter (e.g., slow tempo, fast tempo or a combination of them) may also be applied to the selected clip.

When the input data is information relating to the route select, the input data determines which one (or more) of display monitors 23 are to receive the video clips.

Referring back to FIG. 2, route changer 17 (a Palm Pilot in this exemplary embodiment) is configured to communicate with matrix switcher. The output from computer device 19 is selectively forwarded to one or more of projectors 23 based on signals received from route changer 17. Alternatively, or in addition, route changing signals may be communicated to the matrix switcher from the computer device.

Accordingly, the present invention allows the visual artist to use either a standard computer keyboard or a MIDI keyboard to interact with the software tool, such that striking the keys allows the artist to play the keyboard like an instrument. In addition, the present invention allows performance tools enabling live, real-time "playing" of video and visual effects, with zero latency.

Non-realtime Multimedia Production and Performance System

In another embodiment of the present invention, the artist is allowed to record his/her performances into a standard MIDI sequencer such that the performances may be saved and edited as part of the creative musical process, without the need for or knowledge of traditional digital video editing equipment and software. The performances can then be played back at a later time, in synchronization with other pre-recorded musical or visual elements. This embodiment is particularly useful in a client-server environment.

Figure 4:
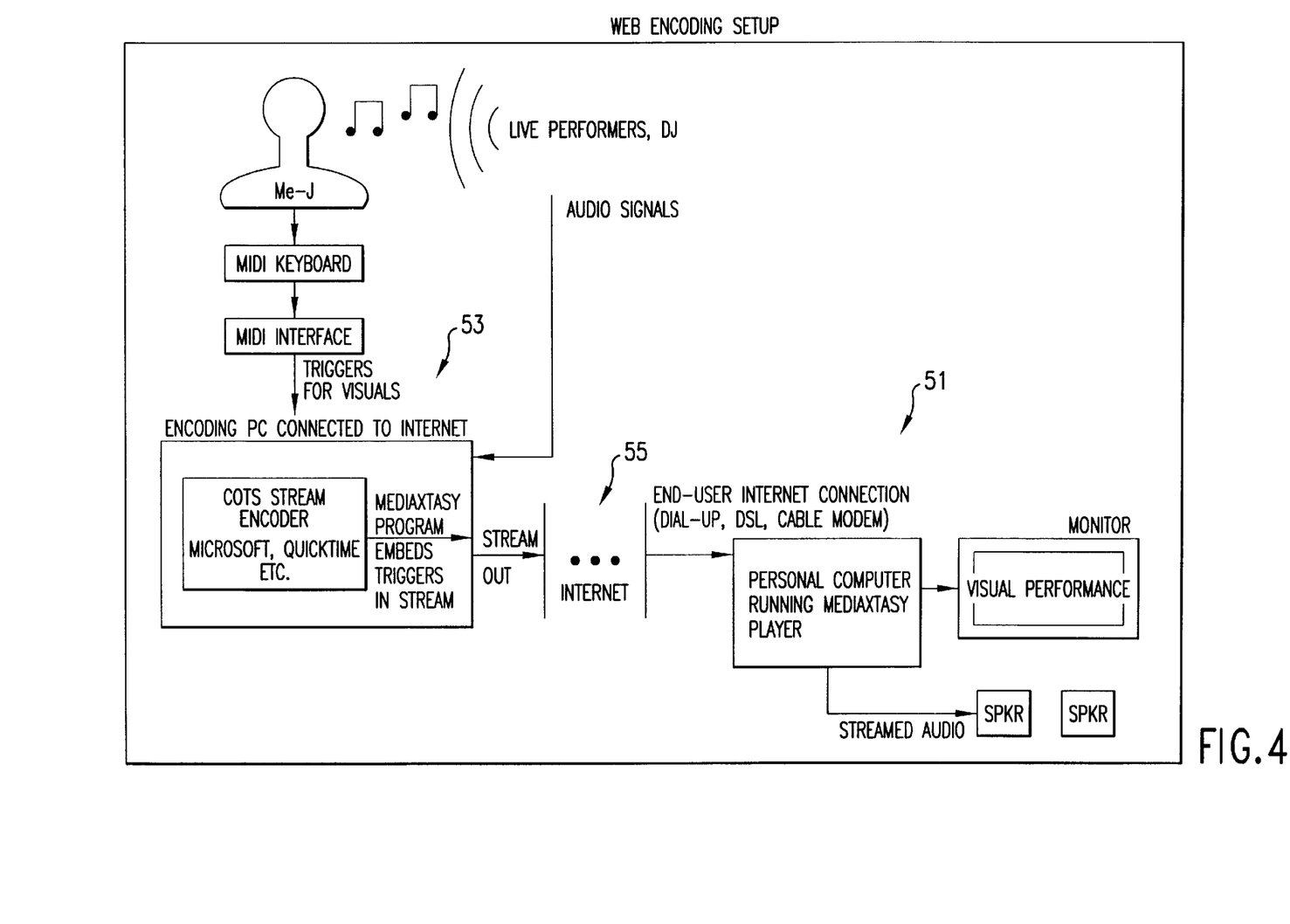
FIG. 4 is a block diagram of the present invention that records the integration of music performance with visual effects to be sent to a client computer.

In particular, referring to FIG. 4, this embodiment preferably includes a client computer 51 connected to a server computer 53 via the Internet 55. Various other ways to connect client computer 51 to server computer 53 available to one skilled in the art are also contemplated within the present invention. In addition, although the following discussion of client computer 51 is mostly directed to one client computer 51 and one user thereof, the same descriptions of the client computer and its features are to be duplicated in numerous other client computers and for users thereof.

Client computer 51 is preferably a personal computer (PC). The specific type of processor and operating system used by client computer 51 is not critical to the present invention. Client computer 51 and server computer 53 preferably communicate with each other using a common communication protocol, such as Hypertext Markup Language (HTML), Java, JavaScript, Extended Markup Language (XML) or other similar communication protocol available in the art.

In this embodiment, the selections made by the artists are generated as trigger tags (e.g., coded signals). The triggers are then combined with the music performance, which then can be stored into a file or burned onto a DVD disc. Subsequently, the user at client computer 51 is allowed to connect to server computer 53 using its specific URL over TCP/IP connection (i.e., the Internet). Server computer 53 downloads the music performance with the trigger tags to client computer 51. Client computer 51, as it receives the data stream including the music performance and trigger tags, parses the data in order to extract the trigger tags. The audio portion of the data is treated as a normal audio stream and is played back through the client computer's audio card.

Figure 5:
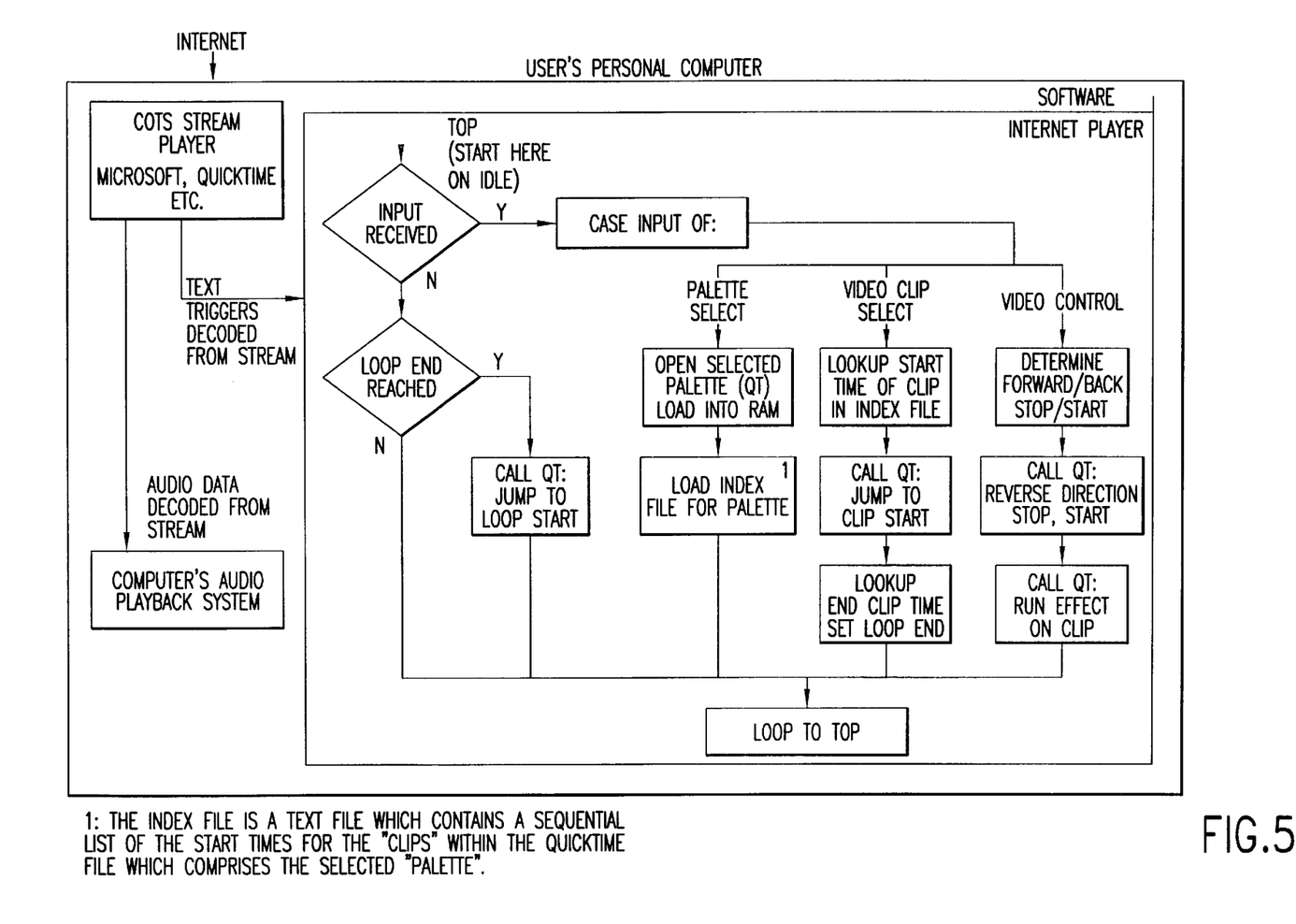
FIG. 5 is a flow chart of the present invention for playing recorded integration of music performance with visual effects.

As trigger tags are pulled from the downloading data stream, they are parsed to evaluate whether they are commands to send to the client computer's 51 graphic engine, or commands which should initiate a request to download an image into the graphics engine's cache. A tag which indicates a request to download an image causes the player application to initiate an http connection with the specified URL, so that it may be downloaded into the graphics engine's cache. In this way, a downloading audio stream is played back, with graphic effects that are controlled remotely, but are displayed locally, in synchronization with the audio on the end-user's computer. A tag which comprises a command for the graphics engine will be sent to the graphics engine causing it to immediately display the requested graphic with the requested effect (if any). In other words, referring to FIG. 5, with palettes and trigger tags loaded, client computer 51 can function as computer device and its processor as shown in FIG. 3. It should be noted that the contents of selected palettes may be pre-downloaded to client computer 51 for client computers with low bandwidth connections, to thereby allow the music and visual effects to be played in realtime.

The above described client-server configurations provide on the Web music/visual effect integration, whether live, archived or pre-recorded. Even client computers having only low bandwidth (e.g., 56K) modems will be able to use the present system. In other words, a user at a client computer may download a visual palette in advance, either from a CD or the Internet. This approach fully utilizes the client computer's processing power without taxing connections of widely varying speeds with bandwidth intensive video streams. The visual effects of the present invention will appear in real time, with high-resolution, full screen display for nearly all client computers, and will consist of original content that is truly unique to the medium.

In addition, this playback technique opens up a revolutionary new kind of interactivity for the end-user. Palettes include numerous categories of clips that are coded to be interchangeable, and that can randomly substitute for one another. More specifically, one or more tags are associated with a random number (or a sequence of numbers) designating different video clips in one recorded performance. Accordingly, each time the recorded performance is played different video clips are played, thereby "self-morphing" the performance. The user may also have an option of viewing the video either exactly as performed, or as a "self-morphing" video, with thousands of possible variations, all of which "work" effectively with the music. The user is prompted at the end of the track with the option of saving that version, if it were particularly appealing, or e-mailing it to a friend.

The present invention also opens up a vast new market for broadband-compatible "re-mixes" of existing, popular video and audio content, using pre-existing audio or video tracks as inputs. Such "re-mixes" should have a place on music television, where the present invention can provide a fresh approach to programming that has lost much of its earlier novelty, as music television programming turns increasingly to other, non-video programming formats. Not only do these "video re-mixes" offer a new interpretation of an old video, but because each composition contains multiple visual tracks, multiple "versions" of re-mixes could be released at once (for example, video-remixes of a single track, as interpreted by different visual artists), keeping the interest level high over time.

The DVD Environment

Even though DVD accommodates surround sound (5 audio tracks) and up to 9 visual tracks, most music releases on DVD have not been mixed in true surround sound, and the accompanying visual track is typically standard music video, such as a prerecorded concert film music video or commentary. However, the above described present system provides contents (i.e., visual effects) with which to fully utilize the extra tracks.

In particular, a standard 5.1 AC-3 stream is encoded using 4 channels of Audio Mix Material (Left, Right, Surround-Left and Surround-Right in .wav, .aif or SDII format) derived from the production Mix, plus a LFE/Sub channel containing Audio data for the Lower frequencies.

The center channel is encoded with Linear Time Code (LTC). This is accomplished using an audio file which contains analog SMPTE timecode recorded into an appropriate digital format (.aif, .wav or SDII). The result is a 4.1.1 AC-3 stream containing 4 channels of Program Mix with LFE and a TimeCode track (center channel). The center channel TimeCode track can be read by a standard SMPTE reader.

The disk is played back on any standard CD player which has a SP/DIF digital output. The SP/DIF output is sent to a hardware AC-3 decoder which separates the audio information in the AC-3 stream into the surround elements for output to the amplifier and speaker system, and the center channel output which is sent to and read by the SMPTE reader to provide a timebase and address base for any other hardware or software which is to be synchronized to the Disc playback.

The above described embodiment of the present invention encourages and allows artists to re-release existing material on DVD, because of, among others, the 3-dimensional audio opportunities that surround opens up. Additionally, the multiple visual tracks are the perfect vehicle for the present invention, which is capable of projecting simultaneously on multiple surfaces. In the context of DVD, these visual tracks offer alternative "views" of the surround music track, again keeping interest high over time, as the user becomes familiar with the depth of content. Here, again, consumers are offered compelling new content, giving them a good reason to buy the DVD, even if they already own all of the CDs and videos by that artist. To the fan, this raises the DVD from the realm of "collectible" to that of "must have."

Although the preferred embodiments of the invention have been described in the foregoing description, it will be understood that the present invention is not limited to the specific embodiments described above.

What is claimed is:

1. A method for integrating music performance with visual effects, the method comprising:

storing a plurality of items each of which contains visual effect;

allowing a first user to select at least one subset of the plurality of items;

forming each of the at least one selected subset of the plurality of items into a file;

allowing a second user to select one of the files;

allowing the second user to select one item in the selected file; and playing the selected item as the music performance is being played thereby integrating the visual effect of the selected item with the music performance.

2. The method of claim 1 further comprising:

allowing a third user to vote on the selected subset of the plurality of items.

3. The method of claim 1 further comprising:

storing a plurality of video clips as the plurality of items, wherein video clips are computer generated graphics, video and film clips, live video camera input or photographic still images.

4. The method of claim 1 further comprising:

indexing each of the items in the file to be arranged in a sequence; and storing start and end times of each indexed item.

5. The method of claim 1 wherein the first and second users are one person.

6. A method for integrating music performance with visual effects, comprising:

storing a plurality of files each containing a plurality of visual effect items;

allowing a user to select one of the plurality of files and to select one of the visual effect items as the music performance is being played;

continually determining whether or not input data is received until the input data is received from the user;

determining the nature of the input data; and playing the selected item, to thereby integrate the visual effect of the selected item with the music performance.

7. The method of claim 6 further comprising:

loading into a computer memory an index of the selected file if the input data relates to a selection of files, wherein the index includes data relating to start and end time of each item contained in the selected file.

8. The method of claim 7 further comprising:

storing the index onto a Digital Versatile Disc (DVD).

9. The method of claim 7 further comprising:

loading into the computer memory the start and end times of the selected item if the input data relates to a selection of items.

10. The method of claim 6 wherein the visual effect items are played in realtime without any perceivable latency.

11. The method of claim 6 wherein the visual effect items are played in synchronization with a music performance without any perceived latency.

* * * * *